United States Patent [19]

Dunn et al.

[11] 4,020,039
[45] Apr. 26, 1977

[54] VULCANIZABLE ELASTOMERIC COMPOSITIONS

[75] Inventors: John Robert Dunn; Douglas Currie Coulthard, both of Sarnia, Canada

[73] Assignee: Polysar Limited, Sarnia, Canada

[22] Filed: Feb. 28, 1975

[21] Appl. No.: 554,142

[30] Foreign Application Priority Data

May 13, 1974 Canada ............................. 199653

[52] U.S. Cl. ...................... 260/42.37; 260/42.32; 260/79.5 B; 260/879; 526/20; 526/41
[51] Int. Cl.$^2$ ........................................ C08K 3/36
[58] Field of Search ........ 260/42.32, 42.37, 79.5 B, 260/879; 526/41, 20

[56] References Cited

UNITED STATES PATENTS 2,925,407  2/1960  Goldberg .......................... 260/83.3
3,795,655  3/1974  Le Claire ...................... 260/79.5 B

OTHER PUBLICATIONS

Kovacic et al., Crosslinking of Unsaturated Polymers with Dimaleimides, In Kraus, Reinforcement of Elastomers, Interscience, Pub., New York, 1965, p. 417.
Materials and Compounding Ingredients for Rubber, 1965, Bill Communications, Inc., p. 238.

Primary Examiner—James H. Derrington
Attorney, Agent, or Firm—Stevens, Davis, Miller & Mosher

[57] ABSTRACT

Improved vulcanizable elastomeric compositions are provided which contain a vulcanization co-agent, the improvements being found in, separately or in combination, the scorch time and compression set and in the stress-strain and aging properties of the vulcanizates thereof.

10 Claims, No Drawings

VULCANIZABLE ELASTOMERIC COMPOSITIONS

This invention relates to vulcanizable elastomeric compositions from which to prepare vulcanizates having improved properties. It particularly relates to vulcanizable elastomeric compositions containing non-black particulate fillers.

The increased severity of service conditions, particularly those associated with temperature, to which vulcanizates of polymers of conjugated diolefins are subjected has created a need for improvements. This severity of thermal oxidation and the need to provide elastomeric articles of improved or increased service life, particularly in view of the current materials shortages, have emphasized the need for improvement in this area of the art.

A problem has long been recognized due to the higher compression set experienced with the vulcanizates of polymers of conjugated diolefins when, instead of using carbon black as the filler, there was used non-black inorganic particulate filler. The term compression set refers in the art to a deformation remaining on removal of an applied compressive force. Thus, vulcanizates prepared from elastomers of a conjugated diolefin and a non-black filler may have compression set values as much as 50 to 100 percent higher than for vulcanizates where carbon black was used as the filler. Such high compression set values have not permitted the use of non-black filled vulcanizates in dynamic seals such as shaft, O-ring seals and similar applications, when sulfur rather than peroxide was used as the vulcanizing agent. Concurrent with attempts to overcome this high compression set when non-black fillers are used has often been the confrontation of a further problem, namely, an onset of premature curing of the compounded non-black filled elastomeric composition upon exposure to processing temperatures; this tendency toward premature curing is known in the art as scorch.

One approach to improving the heat resistance of rubber vulcanizates has been to extend the upper temperature limits of the vulcanizate by innovations in the ingredients compounded with the rubber. One such technical approach has been the use of cadmium and magnesium containing ingredients in combination with low amounts (0.05–2.5 parts by weight) of sulphur, thereby providing monosulphidic crosslinks in the vulcanizates. In the art, it is well known that monosulphidic crosslinks are more resistant to deterioration at high temperatures than the polysulphidic crosslinks. Further protection has been offered by particular combinations of antioxidants especially for the cadmium and magnesium containing vulcanizates.

In a different approach to yielding vulcanizates of improved heat resistance N,N'-linked maleimides has been promoted as the vulcanization agent for highly unsaturated rubbers, in association either with organic peroxides or with thiazole-type accelerators in the absence of elementary sulphur. Di-maleimides have also been taught for the vulcanization of a polymer containing halogen groups or epoxy groups especially the acrylate type polymers and chloroprene polymers.

The use of bis-vinylidine crosslinkable monomers, such as ethylene dimethacrylate added during the compounding of the rubber, has also been known as vulcanization co-agents particularly in peroxide vulcanization systems.

It is an object of this invention to provide an improved vulcanizable elastomeric composition containing a non-black particulate filler and a vulcanization co-agent.

It has now been discovered that vulcanizable elastomeric compositions, suitable for preparing vulcanizates having improved properties, comprise cadmium oxide or zinc oxide containing low sulphur-content elastomeric mixture containing non-black inorganic particulate fillers which mixtures also contain a vulcanization co-agent. Such vulcanizable elastomeric compositions and the vulcanizates derived therefrom have been found to constitute an improvement over the prior art and to overcome, separately or in combination, many of the well known prior art deficiencies including scorch time, compression set, stress-strain properties and aging resistance.

The improved vulcanizable elastomeric compositions of this invention comprise 1. 100 parts by weight of a rubbery polymer containing at least 50 weight % but not more than 85 weight % of polymerized $C_4 - C_6$ conjugated alkadiene units;
2. from about 10 to 200 parts by weight of filler selected from the non-black inorganic particulate fillers;
3. antioxidant;
4. a vulcanization system containing in combination
   a. from 0.05 to 2.5 parts by weight of sulphur,
   b. from 2 to 20 parts by weight of magnesium oxide,
   c. from 2 to 10 parts by weight of cadmium oxide or zinc oxide, and
   d. one of
      i. 1 to 8 parts by weight of cadmium dialkyl dithiocarbamate wherein said alkyl groups contain 1 to 5 carbon atoms, or
      ii. 0.2 to 8 parts by weight of tetraalkyl thiuram disulphide wherein said alkyl groups contain 1 to 4 carbon atoms;

the improvement being the presence of a vulcanization coagent selected from at least one of
   A. N,N'-m-phenylene dimaleimide, and
   B. an acrylic ester monomer containing at least one and not more than three polymerizable carbon-carbon double bonds.

The rubbery polymer employed in the present invention contains at least 50 weight percent but not more than 85 weight percent of polymerized $C_4$-$C_6$ conjugated alkadiene units. Such alkadiene units include butadiene and isoprene. The monomer copolymerized with said conjugated alkadiene is selected from vinyl or vinylidene aromatic compounds such as styrene and α-methyl styrene or from acrylic nitrile monomers such as acrylonitrile and methacrylonitrile. Polymers of a conjugated alkadiene and a vinyl aromatic compound such as styrene-butadiene copolymers containing from about 15 to about 45 weight percent of styrene are rubbery polymers of well known use. Preferred styrene-butadiene copolymers contain from about 17 to about 30 weight percent of styrene. Polymers of a conjugated alkadiene and an acrylic nitrile include the preferred butadiene-acrylonitrile copolymers containing from 15 to 50 weight percent of acrylonitrile, well known especially for oil-resistant applications; those copolymers having from 25 to 45 weight percent polymerized acrylonitrile units are particularly preferred.

The fillers used in the elastomeric compositions of this invention are non-black inorganic particulate fillers. Such fillers include the carbonates such as calcium carbonate, diatomaceous earth, talc, clays, silicates, silicas, silico-aluminates, the various surface treated or coated clays, carbonates and silicas, and mixtures thereof. Also included in such non-black fillers are the lubricating or friction-reducing fillers such as the platey graphites, which may be used alone or in combination with other non-black fillers. The quantity of fillers used may be from 20 parts to 200 parts by weight per 100 parts by weight of polymer. Preferably, the quantity of filler is from about 50 parts to about 125 parts by weight. When a lubricating filler is used, from 10 parts to about 50 parts by weight per 100 parts by weight of polymer may be used alone or in combination with up to an equal weight of other non-black fillers, for example up to 50 parts by weight of silica.

The antioxidant systems used in these elastomeric compositions include materials usually added to the rubber during the compounding stage. Suitable antioxidants include the various aromatic amine compounds such as octylated diphenyl amine, N,N'-β-naphthyl-p-phenylene-diamine, polymerized 1,2-dihydro-2,2,4-trimethylquinoline, 2-mercaptobenzimidazole, N-phenyl-N'-cyclohexyl-p-phenylene diamine, the reaction product of diphenylamine and di-isobutylene or mixtures thereof. The quantity of antioxidant added to the compositions is from about 1 part to about 3 parts by weight per 100 parts by weight of polymer; preferably from 1 to 2 parts are added of each of one or more antioxidants. The compositions may also contain up to 15 parts by weight per 100 parts by weight of polymer of a polyether polythioether as described in U.S. Pat. No. 3,163,620. The presence of the polyether polythioether is especially preferred when the polymer is a butadiene-acrylonitrile copolymer when the preferred amount of polyether polythioether is from 5 to 15 parts, most preferably from 8 to 12 parts by weight.

The vulcanization system used with the elastomeric compositions of this invention is relatively complex and necessarily so in order to achieve an acceptable balance of properties and thermal stability of the vulcanizate. The vulcanization system contains from 0.05 to 2.5 parts by weight of sulphur per 100 parts by weight of polymer. Preferably from 0.1 to 1.0 and most preferably 0.3 to 0.6 parts of sulphur have been found to be suitable in this system. The presence of magnesium oxide in the system is said to stabilize the elastomeric composition by controlling the acidity-alkalinity balance. From 2 to 20 parts by weight of magnesium oxide per 100 parts by weight of polymer is used in the present composition, a preferred range being from 5 to 10 parts by weight of magnesium oxide. Cadmium oxide or zinc oxide is employed as an activator for the vulcanization system and additionally adds to the heat stability of the vulcanizate. From 2 to 10 parts by weight of either zinc oxide or cadmium oxide per 100 parts by weight of polymer is used in this system. A preferred amount of cadmium oxide or zinc oxide is from 4 to 6 parts by weight. Cadmium oxide is the preferred metal oxide for this vulcanization system, especially for high heat stability. The accelerator system used in this vulcanization system is selected from one of a cadmium dialkyl dithiocarbamate or a tetra-alkyl thiuram disulphide. When cadmium dialkyl dithiocarbamates are used, the alkyl group contains from 1 to 5 carbon atoms, and the amount of the dithiocarbamate is from 1 to 8 parts by weight per 100 parts of polymer. Preferably from 1 to 2.5 parts by weight will be used. Such dithiocarbamates can be used alone or in combination with secondary accelerators of the thiazole type or the thiuram disulphide type or the guanidine type, the thiazole type being particularly preferred. When the tetraalkyl thiuram disulphide is used, the alkyl groups contain from 1 to 4 carbon atoms. The weight of such thiuram disulphide used is from 0.2 to 8 parts by weight per 100 parts by weight of polymer, preferably from 1 to 5 parts by weight. Secondary accelerators may also be used in conjunction with the thiuram disulphide compound.

The vulcanization co-agent of this invention is selected from one of N,N'-phenylene dimaleimide and an acrylic ester monomer containing at least one and not more than three polymerizable carbon-carbon double bonds. Suitable acrylic ester monomers may be a (meth-)acrylate diester of a $C_2$–$C_4$ glycol, a (meth-)acrylate ester of allyl alcohol and a (meth-)acrylate ester of a substituted ethyl alcohol such as tertiary butyl amino ethyl alcohol. suitable acrylic ester monomers include butylene dimethacrylate, ethylene dimethacrylate, trimethylol propane trimethacrylate, allyl methacrylate and t-butylamino-ethyl methacrylate. The amount of such vulcanization co-agent added to the elastomeric composition is from 0.5 to 10 parts by weight per 100 parts by weight of polymer. Preferably the amount of such co-agent added to the elastomeric composition is from 1 to 3 parts by weight. Such vulcanization co-agents are added to the elastomeric composition during the normal compounding process. They may be added at the stage when the fillers are mixed in with the rubber or they may be added at the stage when the curing agents are incorporated into the rubber compound.

The vulcanizable elastomeric compositions of this invention may be vulcanized by heating under the well known conditions of time and temperature. Temperatures of 150°–200° C and times of 1–120 minutes may be used, the preferred temperature being from 160° C to 180° C and the preferred time being from 5 to 30 minutes.

The following examples serve to illustrate the invention and not to limit the scope thereof.

EXAMPLE 1

Rubber-based mixtures were prepared as shown below and using well known mixing procedures the rubber used being a copolymer of butadiene/acrylonitrile of weight ratio 69/31 and having a Mooney viscosity (ML 1+4' at 100° C) of 30.

|  | I-A | Controls I-B | I-C | Experimental |
|---|---|---|---|---|
| Rubber (parts by weight) | 100 | 100 | 100 | 100 |
| Sulphur | 0.4 | 0.4 | 0.4 | 0.4 |
| Co-agent: N,N'-m-phenylenedimaleimide | 0 | 2 | 0 | 2 |
| Antioxidant: polymerized 1,2-dihydro-2,2,4-trimethyl-quinoline | 1.0 | 1.0 | 1.0 | 1.0 |
| Antioxidant: reaction product of diphenylamine-di-isobutylene | 1.0 | 1.0 | 1.0 | 1.0 |
| White filler (a) * | 10 | 10 | 10 | 10 |
| (b) ** | — | — | 40 | 40 |
| Semi-reinforcing furnace carbon black ASTM type N762 | 50 | 50 | — | — |
| Stearic acid | 1.0 | 1.0 | 1.0 | 1.0 |
| Cadmium oxide | 5.0 | 5.0 | 5.0 | 5.0 |
| Magnesium oxide | 10.0 | 10.0 | 10.0 | 10.0 |
| Polyether polythioether[(1)] | 10.0 | 10.0 | 10.0 | 10.0 |
| N-cyclohexyl-2-benzo-thiazole sulfenamide | 2.0 | 2.0 | 2.0 | 2.0 |
| Mixed alkylthiuram di- | | | | |

-continued

|  | I-A | Controls I-B | I-C | Experimental |
|---|---|---|---|---|
| sulfide[(2)] | 2.5 | 2.5 | 2.5 | 2.5 |

*A particulate hydrated silica further identified by the Trademark HI-SIL 233, and having a specific surface area of 150 m²/gram.
**A particulate hydrated silica further identified by the Trademark HI-SIL EP, and having a specific surface area of 60 m²/gram.
[(1)]Further identified by the Trademark PLASTIKATOR OT.
[(2)]Further identified by the Trademark PENNAC TM.

Each unvulcanized mixture was tested for Mooney scorch test, ASTM Method D-1646-68, wherein the effect determined is the length of time required for a 5 point rise in the viscosity reading; the higher the scorch time, the greater the processing time available before danger of onset of scorch. The test values are as follows:

|  | I-A | I-B | I-C | Experimental |
|---|---|---|---|---|
| Mooney scorch, minutes to 5 point rise at 125° C | 19 | 18 | 14 | 18½ |

For the black-filled compounds I-A and I-B, the scorch time is satisfactory and the presence of the maleimide co-agent has no significant effect on the scorch time. However, in the white filled mixture I-C, the shorter scorch time is seen, and the experimental compound shows the improvement in the scorch time due to the presence of the maleimide co-agent.

Vulcanizates were prepared from each of the above four rubber compounds by heating for 12 minutes at 166° C. The stress-strain and compression set (ASTM D-395, Method B) properties of the vulcanizates were measured with the results listed in Table I.

TABLE I

|  | I-A | I-B | I-C | Experimental |
|---|---|---|---|---|
| Tensile strength at break kg/cm² | 155.4 | 175.0 | 118.3 | 151.2 |
| Elongation at break, % | 440 | 450 | 500 | 500 |
| Modulus at 300% elongation, kg/cm² | 100.1 | 98.7 | 57.4 | 78.4 |
| Compression set, % 70 hrs. at 149° C | 44.5 | 48 | 88 | 63 |

Comparison of the tensile, elongation and modulus values shows the two black-filled vulcanizates to be very similar, independent of whether the co-agent is present, whereas the presence of the co-agent in the white-filled vulcanizate (Experimental) has caused these values to be increased almost to the level of those for the black-filled vulcanizates. The compression set for the co-agent containing white-filled vulcanizate is markedly improved compared to I-C although still not quite as good as for the black-filled vulcanizates.

The improvements due to the presence of the maleimide co-agent in the white-filled vulcanizate are clearly seen.

EXAMPLE 2

Further experiments were conducted using the recipe of experiments I-C and Experimental of Example 1 but varying the amount of maleimide additive. The test results for these experiments are shown in Table II. The benefits in the stress-strain properties and the compression set are clearly evident.

TABLE II

|  | Control | Experimental |  |  |
|---|---|---|---|---|
| Parts by weight maleimide additive | 0 | 1 | 3 | 4 |
| Scorch, time in min. at 125° C | 14 | 16½ | 18 | 18½ |
| Tensile, kg/cm² | 118.3 | 135.8 | 135.1 | 145.6 |
| Elongation, % | 500 | 480 | 440 | 440 |
| Modulus, kg/cm² | 57.4 | 76.3 | 86.8 | 92.4 |
| Compression set, % 70 hrs. at 149° C | 88 | 78 | 60.5 | 61 |

EXAMPLE 3

A copolymer of butadiene/acrylonitrile having 34 weight % of acrylonitrile and a Mooney viscosity of 60 mixed according to the formulation identified as "Experimental" in Example 1 except that 5 parts of zinc oxide was used in place of the cadmium oxide. The "Control" contained no maleimide co-agent additive.

Scorch times on the unvulcanized compositions were determined, and stress-strain properties and compression set were measured on the vulcanizates prepared by curing for 10 minutes at 166° C with the results shown in Table III.

TABLE III

|  | Control | Experimental |
|---|---|---|
| Scorch at 125° C, minutes | 11½ | 18½ |
| Tensile strength, kg/cm² | 126.0 | 144.9 |
| Elongation % | 700 | 730 |
| Modulus at 100% elongation, kg/cm² | 25.9 | 30.1 |
| Compression set, % 70 hrs at 149° C | 81.5 | 55 |

The improved scorch time, strength properties and compression set are readily apparent when the co-agent is present.

EXAMPLE 4

A further series of compositions were prepared as in Example 3 with the exception that:
a. 1 phr of a processing aid identified by the Trademark TE80 was also added and
b. the co-agent type and amount which are as identified in Table IV.
In addition to the previous property measurements, the stress-strain properties were determined after aging in test tubes in air at 150° C for 70 hours with the results shown in Table IV.

The improvements due to the presence of the co-agent can be seen in the compression set values and the retention of strength properties on aging.

TABLE IV

| Sample | Co-agent | Amt. phr | Scorch (min.) | Comp. set % | T | Unaged $E_b$ | $M_{100}$ | H | Aged in Air at 150° C T | $E_b$ | $M_{100}$ | H |
|---|---|---|---|---|---|---|---|---|---|---|---|---|
| Control | No co-agent additive | — | 8 | 75 | 163 | 690 | 12 | 52 | 124 | 410 | 48 | 69 |
| IV-A | 1,3-butyleneglycol di-methacrylate | 2.5 | 14 | 58 | 132 | 600 | 14 | 58 | 112 | 360 | 40 | 71 |
| IV-B | " | 5.0 | 14 | 56 | 143 | 610 | 14 | 56 | 114 | 380 | 40 | 73 |

TABLE IV-continued

| Sample | Co-agent | Amt. phr | Scorch (min.) | Comp. set % | T | Unaged $E_b$ | $M_{100}$ | H | Aged in Air at 150° C T | $E_b$ | $M_{100}$ | H |
|---|---|---|---|---|---|---|---|---|---|---|---|---|
| IV-C | Allyl methacrylate | 3 | 14 | 62 | 138 | 600 | 15 | 59 | 138 | 680 | 16 | 62 |
| IV-D | t-butyl amino ethyl methacrylate | 5 | 10 | 62 | 132 | 620 | 12 | 55 | 134 | 700 | 16 | 62 |

Note:
T is tensile strength, kg/cm²
$E_b$ is elongation at break %
$M_{100}$ is 100% modulus, kg/cm²
H is Shore A hardness

EXAMPLE 5

This example relates to the preparation of an improved oil-resistant shaft or bearing seal wherein a lubricant-type graphite filler has been introduced into the elastomeric composition.

A filled oil-resistant rubber mixture was prepared from the following formulation using the butadiene/acrylonitrile copolymer of Example 3.

| | Parts by Weight |
|---|---|
| Butadiene/acrylonitrile rubber | 100 |
| Sulphur | 0.4 |
| Antioxidant: reaction product of diphenylamine and di-isobutylene | 1.0 |
| Antioxidant: polymerized 1,2-dihydro-2,2-4-trimethyl-quinoline | 1.0 |
| Co-agent: N,N'-m-phenylene dimaleimide | 2.0 |
| Stearic acid | 1.0 |
| Cadmium oxide | 5.0 |
| Magnesium oxide | 10.0 |
| Polyether polythioether (PLASTIKATOR OT) | 10.0 |
| White silica-type filler (HI-SIL 233) | 10.0 |
| White silica-type filler (HI-SIL EP) | 20.0 |
| Graphite lubricant filler having plate-like particles [1] | 30.0 |
| N-cyclohexyl-2-benzothiazolesulfenamide | 2.0 |
| Mixed alkyl thiuram disulfide (PENNAC TM) | 2.5 |

[1] Further identified under the tradename DIXON 1176.

The uncured rubber mixture was tested for scorch at 125° C and was found to have a safe level of 19.5 minutes. A vulcanizate prepared by curing for 10 minutes at 166° C was tested for compression set and the stress-strain properties were determined before and after aging in No. 3 ASTM oil at 140° C for 168 hours and after hot air ageing. The results are given in Table V and they show that, even though as high as half of the white filler has been replaced by a lubricant-type graphite filler, the properties of the vulcanizate are still within useful limits. By contrast, if the co-agent additive had not been present in this white-filled composition, the scorch would have been very poor and the vulcanizate properties, especially the compression set, would have been unacceptable.

TABLE V

| Vulcanizate properties: | |
|---|---|
| Compression set, %, 70 hours at 149° C | 54 |
| Unaged: | |
| Tensile strength, kg/cm² | 119 |
| Elongation at break, % | 600 |
| Modulus at 100% elongation, kg/cm² | 23.8 |
| Hardness, Shore $A_2$ | 58 |
| Aged in No. 3 ASTM oil for 168 hours at 149° C | |
| Tensile, % change from unaged test value | −26 |
| Elongation, % " | −7 |
| Modulus, % " | −35 |
| Hardness, points change | — |
| Aged in air in oven at 149° C for 70 hours | |
| Tensile, % change | −10 |
| Elongation, " | −9 |
| Modulus, " | +47 |
| Hardness, points change | +14 |

EXAMPLE 6

In this experiment white-filled heat-resistant vulcanizates were prepared from a styrene/butadiene rubber (SBR). While such vulcanizates cannot be expected to have the level of heat resistance provided by a nitrile-type rubber vulcanizate, there is nevertheless a service level for the less expensive SBR vulcanizate. Rubber mixtures were prepared, the one a control containing no co-agent and the other containing the maleimide co-agent, in the formulation as follows:

| | Control | Experiment |
|---|---|---|
| SBR (23.5 wt. % bound styrene Mooney viscosity ML-4 at 100° C of 51) | 100 | 100 |
| Stearic acid | 0.5 | 0.5 |
| Zinc oxide | 5.0 | 5.0 |
| Magnesium oxide | 5.0 | 5.0 |
| Antioxidant: reaction product of diphenylamine and di-isobutylene | 2.0 | 2.0 |
| Co-agent: N,N'-phenylene dimaleimide | — | 2.0 |
| White silica-type filler (HI-SIL 233) | 20 | 20 |
| Precipitated hydrated silica [1] | 40 | 40 |
| Sulphur | 0.25 | 0.25 |
| N-cyclohexyl-2-benzothiazolesulfenamide | 2.0 | 2.0 |
| Mixed alkyl thiuram disulfide (PENNAC TM) | 3.0 | 3.0 |

[1] Further identified by the tradename SILENE D.

The scorch time for the unvulcanized rubber mixture was found to be 11 minutes for the control mixture and 13 minutes for the experimental mixture.

Vulcanizates of the mixtures were prepared by curing for 10 minutes at 166° C, and the stress-strain properties were determined before and after aging in test tubes in air at 135° C. The compression set values of the vulcanizates were also determined. These test values are shown below in Table VI.

TABLE VI

| | Control | Experiment |
|---|---|---|
| Compression set % 70 hrs. at 135° C | 60 | 54 |
| Unaged, stress-strain tests: | | |
| Tensile, kg/cm² | 81.2 | 91.0 |
| Elongation at break, % | 540 | 550 |
| Modulus at 100% elongation, kg/cm² | 15.4 | 21.0 |
| Aged, stress-strain tests: | | |
| Tensile, % change | +10 | −5 |
| Elongation, % change | −20 | −5 |
| Modulus, % change | +120 | +33 |

These data again point to the unobvious improvements provided in a white-filled heat-resistant vulcanizate prepared according to this invention. The compression set is improved, while not only are the stress-strain properties of the unaged vulcanizate more favourable but those of the vulcanizate exposed to hot air aging are much improved over the control composition, particularly as seen by the small increase in the modulus.

Similar improvements were found for a vulcanizate prepared as for the experimental composition above but where the zinc oxide was replaced by cadmium oxide.

What is claimed is:

1. An improved vulcanizable elastomeric composition comprising:
   1. 100 parts by weight of a rubbery polymer containing at least 50 weight percent but not more than 85 weight percent of polymerized $C_4$–$C_6$ conjugated alkadiene units;
   2. from 10 parts to 200 parts by weight of filler selected from the non-black inorganic particulate fillers;
   3. antioxidant;
   4. a vulcanization system containing in combination
      a. from 0.05 to 2.5 parts by weight of sulphur,
      b. from 2 to 20 parts by weight of magnesium oxide,
      c. from 2 to 10 parts by weight of one of cadmium oxide or zinc oxide.
      d. one of
         i. 1 to 8 parts by weight of cadmium dialkyl dithiocarbamate wherein said alkyl groups contain 1 to 5 carbon atoms, or
         ii. 0.2 to 8 parts by weight of a tetraalkyl thiuram disulphide wherein said alkyl groups contain 1 to 4 carbon atoms;

the improvement being the presence of from 0.5 to 10 parts by weight of as vulcanization co-agent N,N'-m-phenylene dimaleimide.

2. The composition of claim 1 wherein the rubbery polymer is a butadiene/acrylonitrile copolymer.

3. The composition of claim 1 wherein the rubbery polymer is a butadiene/styrene copolymer.

4. The composition of claim 2 wherein the butadiene/acrylonitrile copolymer contains from 25 to 45 weight percent of acrylonitrile.

5. The composition of claim 3 wherein the butadiene/styrene copolymer contains from 17 to 30 weight percent of styrene.

6. The composition of claim 1 in which the filler is selected from calcium carbonate, diatomaceous earth, talc, clay, silicates, silica, platey graphite and mixtures thereof.

7. The composition of claim 6 wherein the filler is a mixture of from 10 to 50 parts by weight of platey graphite with up to 50 parts by weight of silica.

8. The composition of claim 1 in which the vulcanization co-agent is present in an amount of from 1 to 3 parts by weight.

9. The composition of claim 2 which also contains from 5 to 15 parts by weight of a polyether polythioether.

10. The composition of claim 9 wherein the vulcanization system contains in combination
    a. from 0.3 to 0.6 parts by weight of sulphur,
    b. from 5 to 10 parts by weight of magnesium oxide,
    c. from 4 to 6 parts by weight of cadmium oxide, and
    d. from 1 to 5 parts by weight of a tetraalkyl thiuram disulphide wherein said alkyl groups contain 1 to 4 carbon atoms.

* * * * *